United States Patent [19]

Sakakibara et al.

[11] Patent Number: 4,838,844
[45] Date of Patent: Jun. 13, 1989

[54] ENDLESS TRANSMISSION BELT

[75] Inventors: Shiro Sakakibara, Toyokawa; Yoshinori Miyaishi, Okazaki; Takashi Furuya, Chiryu, all of Japan

[73] Assignee: Aisin-Warner Kabushiki Kaisha, Anjo, Japan

[21] Appl. No.: 148,785

[22] Filed: Jan. 27, 1988

[30] Foreign Application Priority Data

May 29, 1987 [JP] Japan ................................ 62-137419

[51] Int. Cl.⁴ .............................................. F16G 1/22
[52] U.S. Cl. .................................... 474/240; 474/242
[58] Field of Search ............... 474/237, 242, 244, 245, 474/201, 265

[56] References Cited

U.S. PATENT DOCUMENTS 4,622,025 11/1986 Kern et al. ..................... 474/242 X
4,655,732 4/1987 Takashima ......................... 474/201

Primary Examiner—Thuy M. Bui
Attorney, Agent, or Firm—Frank J. Jordan; C. Bruce Hamburg; Manabu Kanesaka

[57] ABSTRACT

An endless transmission belt is formed of a plurality of symmetrical V blocks. Each V block comprises upper and lower portions disposed approximately parallel to each other, and two pillar portions connecting the upper and lower portions. The block includes side openings on both sides, and a center opening between the pillar portions. The upper and lower portions have wavy configurations, so that the upper and lower portions have flexibility against the force applied from sheaves to the V block.

7 Claims, 2 Drawing Sheets

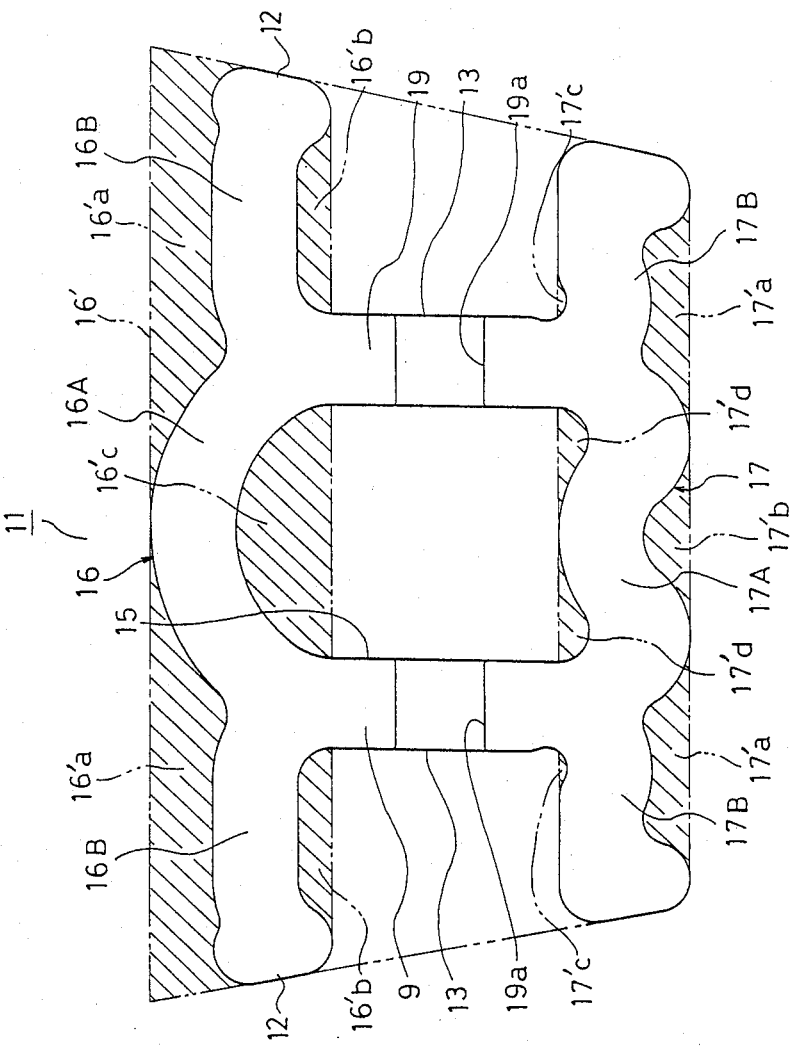

ENDLESS TRANSMISSION BELT

BACKGROUND OF THE INVENTION

1. Field of the Invention

The presnet invention relates to an endless transmission belt, particulary to the belt for continuously variable transmission in which the belt is fitted around a primary and a secondary pulley comprising a pair of sheaves. In detail the present invention relates to an endless transmission belt known as a chain type in which many link plates are linked endlessly by pins, and V-blocks as frictional transmitting elements are respectively sustained between pins.

2. Description of the Prior Art

As shown in the Japanese patent publication No. 60-104824, a V-block used in the endless transmission belt has inclined sides partially or entirely contact a pair of sheaves. The front view of the V-block is trapezoidal, and the center portion of the V-block has an opening to retain link plates.

In the prior art mentioned above, a pin connecting the link plates is supported in the vicinity of the right and left side of the V-block, and the pins and the link plates are connected in the center of the V-block. Because of this structure the force transmitted from the V-block to the link or vice versa gives large bending moment to the pins, so excentric wear on the pin or the link may occur. Furthermore as the V-block is rigid against compressive direction of the sheaves, the V-block contacts the sheaves in point or quite small area due to dimensional error on the sheaves or the V-block, and at the portion where the V-block is led to the pair of sheaves, this causes skid and insufficient torque transmission because many V-blocks can not contact the sheaves evenly and accordingly only some of them share the torque.

Then the applicant proposed the endless transmission belt (refer to Japanese Patent Application No. 61-260760) as follows:

"The endless transmission belt has many link plates laminated and connected by pins and has first and second V-blocks whose front views are trapezoidal and which are laid between pins, and contact such pins. On each first and second V-block, an opening is made to contact the pair of sheaves, and a center opening is made to lay the links which are divided into three rows. (unqte)"

The above endless transmission belt has such merits as: during torque transmission the pins are not bent in bow shape and accordingly the load applied to the link plates is averaged and partial wear of the link plate and the exentric waer of the pins are prevented because during torque transmission, at three points along the pin length the pins and the link plates contact so that the torque transmission is not concentrated.

However the above endless transmission belt has such demerit as:

When the V-block is held by the sheaves it is difficult to deform the upper and lower portions of the V-block horizontally because the structure of the V-block is that the front view is near trapezoidal, the upper and lower portions are connected by the two pillar portions, and each corner is rounded to prevent stress concentration but the radius is small; due to this the contact pressure between the V-block and the sheaves becomes very high, and further the contact has to be conducted in quite small area such as a point-contact unless each V-block is made precisely in dimensions; and uneven contact between the V-block and the sheave may cause destruction of the V-block.

Then the present invention is directed to provide the endless transmission belt having the V-block which is easy to be bent horizontaly so that durability is enhanced in addition to preventing the wear of the link plate and the pins.

SUMMARY OF THE INVENTION

While the invention is made in view of the above description, a brief summary will now be set forth.

As shown in FIG. 1 and FIG. 2 for example, a symmetrical V-block 1 having two sides (2), (2), (12), (12) which contact a pair of sheaves; side openings (3), (3), (13) (13) are made on the sides; a center opening (5), (15); an upper portion (6), (16) and a lower portions (7), (17) which are nearly parallel; pillar portion (9), (9), (19), (19) which are vertically connected with the horizontal members (6), (16), (7), (17), and portions (6A), (6B), (7A), (7B) are made on the upper portion (6), (16) and the lower portion (7), (17) so that the upper and lower portions have flexibility.

Based on the above structure the endless transmission belt is used by fitting around primary and secondary pulleys. At the time of operation the force is transmitted under the condition that the V-block (1), (11) is held by the sheaves of each pulley, and particularly, when the V-block (1), (11) starts bending by contacting the sheaves or when the V-block (1), (11) finishes bending after running through the sheaves, extremely high load is applied to the upper portion (6), (16). However, the sides (2), (2), (12), (12) of the V-block (1), (11) are deformed horizontally so that the V-blocks contact the sheaves with the maximum contact area because the upper and lower portions have flexibility. Then the contact pressure is reduced and the stress is dispersed in wavy areas. At the same time the plural V-blocks contact the sheaves with deforming in accordance with the surface configuration, so the contact pressure from the sheaves evenly dispersed to the V-blocks even though the V-blocks have some dimensional deviations.

All numbers and symbols in parentheses in this section are for reference purpose and do not define claims.

BRIEF DESCRIPTION OF THE DRAWINGS

In the accompanying drawings,

FIG. 2 is a front view of the V block of the endless transmission belt in the second embodiment.

DETAILED DESCRIPTION OF THE PREFERRED EMBODIMENT

Figure 1:
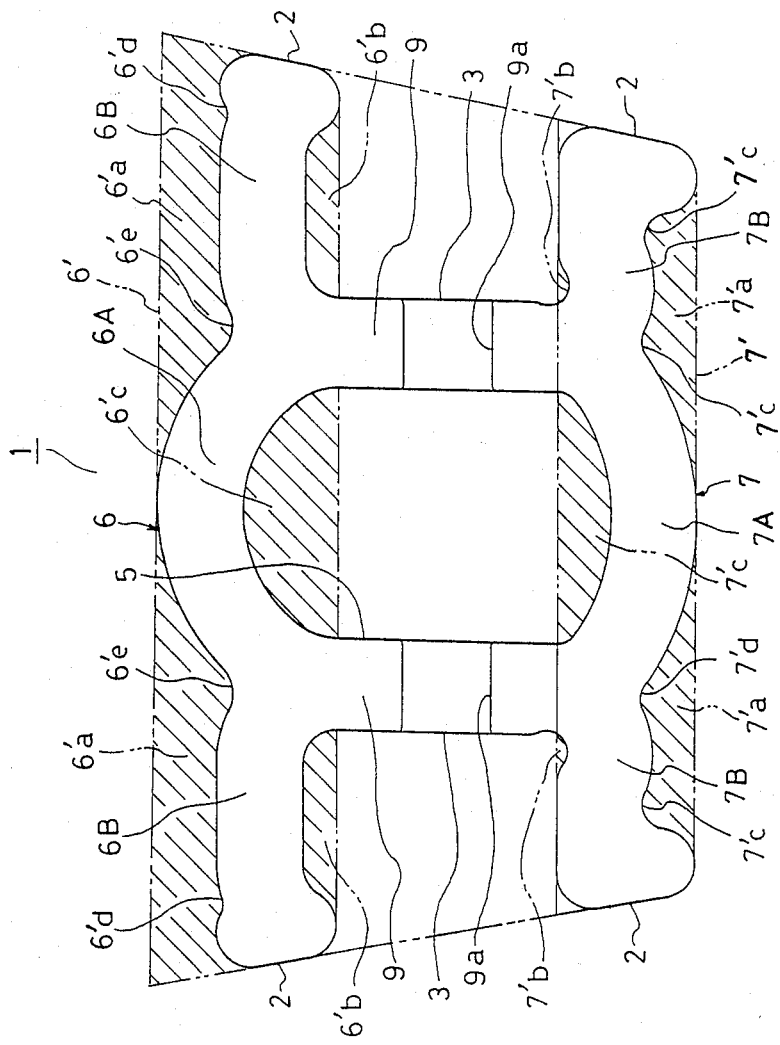
FIG. 1 is a front view of the V block of the endless transmission belt in the first embodiment.

An explanation is given in accordance with the drawings.

A V block 1 for continuously variable transmission belt has a symmetrical and trapezoidal front view. And the V block has tapered sides 2, 2 contacting sheaves where side openings 3, 3 are made and a center opening 5 is made between the side openings 3, 3. An upper portion 6 and a lower portion 7 are connected with pillars 9, 9 vetically and symmetrically. Moreover, grooves 9a, 9a are laid so that a pin may be situated, and in either the front or the back side both sides a taper is made so that the V block continuously can obey the motion of the transmission belt.

In this embodiment, the shape of the upper portion 6 and the lower portion 7 are such that hatched square portion 6', 7' minus hatched portions 6'a, 6'a, 6'b, 6'b, 6'c, 7'a, 7'a, 7'b, 7'b, 7'c. Center portions 6A, 7A on the upper and lower portions 6, 7 have curved extrusions. Arm portions 6B, 6B, 7B, 7B which hang over from the pillars 9, 9 are bent toward outside. Namely the center portions 6A, 7A are made up by the curved surfaces while the upper arm 6B, 6B are made up by eliminating the hatched areas 6'b and 6'c, 6'd, and further the lower arms 7B, 7B are made up by eliminating the hatched areas 7'b and 7'c, 7'd.

The continuous variable transmission belt employing the V block 1 is used in the continuous variable transmission device having a pair of pulleys. The both sheaves of the primary pulley contact the sides of the V block 1, and the torque given from the pulley is transmitted to the V block 1. And from the V block 1, the torque is transmitted to the pin enclosed in the grooves 9a, 9a and to the link plates laid in the side opening 3 and the center opening 5. On the secondary pulley, to the contrary to the primar pulley, the tensile force from the link plates is transmitted to the V block through the pin, and to the secondary pulley through the frictional contact of the sides 2, 2 of the V block and the sheaves.

As mentioned, at the time of the contact, the force is transmitted under the condition that the V block is held by the sheaves. In particular when the V block starts to contact to the pulley or leaves from the pulley, i.e. the posture of the belt quickly changes, the upper portion 6 is exposed to excessive load. Such excessive load is absored by deforming the upper and lower portions and the stress caused by the load is dispersed to the upper and lower wavy areas. Due to the deformation on the upper and lower portions the sides 2, 2 contact the sheaves with the the maximum contact areas, so that the contact pressure is always kept low. Furthermore plural V blocks always contact one pair of sheaves durning force transmission. At this time, even if each V block has dimensional deviation, the V-blocks contact the sheaves by deflecting to follow the sheaves, so that the contact pressure is always evenly dispersed.

The second embodiment which the first embodiment is partially modified is explained.

In place of the lower portion 7, another lower portion 17 whose configuration is made by eliminating the hatched areas 17'a, 17'a, 17'b, 17'c, 17'c, 17'd, 17'd from the square area 17'. And a center portion 17A has a wavy configuration, and arm areas 17B, 17B are bent outward. Other structual elements are as same as the first embodiment, so explanation is eliminated by only adding 10 to the original item numbers.

Due to the second embodiment the lower portion 17 becomes more flexible horizontally.

In the second embodiment, while the center of the lower portion 17 has the wavy configuration, it is voluntarily selected to make such wavy configuration on either the upper portion 16A or both the upper and lower portion 16A, 17A. And it is also voluntarily selected to make such wavy areas only in the arm areas 6B, 16B, 7B, 17B of the upper portions 6, 16 and the lower portions 7, 17.

As explained, due to the present invention bending moment applied to the pins is small by making the side openings 3, 13 and the center opening 15 in the V block while the upper 6, 16 and lower portions 7, 17 are horizontally flexible when the V blocks are held by the sheaves, so that the sides 2, 2, 12, 12 of the V blocks contact the sheaves with the maximum contact area and accordingly the contact pressure is low and the stress applied to the upper and lower portions is dispersed to the wavy areas, so that durability of the V block is enhanced. In addition, the dimensional precision of the V block need not be observed strictly and accordingly the manufacturing cost is lowered because the flexibility of the V block follows the configuration of the sheaves.

What is claimed is:

1. A V-block for an endless transmission belt adapted to contact a pair of sheaves, comprising:
    an upper portion, a lower portion situated under the upper portion, and two pillar portions connecting said upper and lower portions to thereby constitute a symmetrical V-block, said upper and lower portions each having a center portion and two arm portions extending laterally outwardly from the center portion, said center portions of said upper and lower portions having curved configurations and flexibility against pressing force applied to both sides of the upper lower portions, said V-block having a through hole surrounded by the center portions of the upper and lower portions and two pillar portions, and two side openings at both sides of the V-block, each opening being surrounded by the arm portions of the upper and lower portions and the pillar portion.

2. A V-block according to claim 1, wherein the length of the arms of the lower portion is shorter than the length of the arms of the upper portion, said arms of the upper and lower portions having side portions adapted to contact the sheaves.

3. A V-block according to claim 1, wherein said center portions of said upper and lower portions have arcuate configurations extruded outwardly.

4. A V-block according to claim 1, wherein said center portion of said lower portion has a wavy configuration.

5. A V-block according to claim 5, wherein said arm portions of the upper and lower portions are configured by scooping portions situated at plural certain areas of the upper and lower portions.

6. A V-block according to claim 1, wherein said center portions of the upper and lower portions have arcuate configurations extruded outwardly, and said arm portions of the upper and lower portions are configured by scooping portions situated at plural certain areas of the upper and lower portions.

7. A V-block according to claim 1, wherein said center portion of the upper portion has an arcuate configuration extruded outwardly, said center portion of the lower portion having a wavy configuration, said arm portions of the upper and lower port*ions being configured by scooping portions situated at plural certain areas of the upper and lower portions.

* * * * *